United States Patent [19]

Knapp et al.

[11] Patent Number: 4,662,074
[45] Date of Patent: May 5, 1987

[54] METHOD AND APPARATUS FOR DETERMINING PRECISION OF NUMERICALLY CONTROLLED MACHINE TOOL DEVICES

[75] Inventors: Wolfgang Knapp; Stojan Hrovat, both of Zurich, Switzerland

[73] Assignee: Schweizerische Gesellschaft fur Werkzeugmashinenbau und Fertigungstechnik, Zurich, Switzerland

[21] Appl. No.: 532,557

[22] Filed: Sep. 15, 1983

[30] Foreign Application Priority Data

Sep. 20, 1982 [CH] Switzerland ............... 5538/82

[51] Int. Cl.⁴ ............................... G01B 7/28
[52] U.S. Cl. ...................... 33/169 C; 33/172 D; 33/546; 33/551
[58] Field of Search ............. 33/178 R, 178 E, 174 C, 33/169 C, 174 Q, 172 D, 174 P, 179.5 R, 545, 546, 557, 550

[56] References Cited

U.S. PATENT DOCUMENTS

| | | | |
|---|---|---|---|
| 3,259,989 | 7/1966 | Wilson | 33/174 L |
| 3,400,463 | 9/1968 | Barringer | 33/174 L |
| 3,432,932 | 3/1969 | Oellerick et al. | 33/172 D |
| 3,481,043 | 12/1969 | Esch | 33/174 P |
| 3,615,143 | 10/1971 | Barr et al. | 33/174 L |
| 3,826,011 | 7/1974 | D'Aniello | 33/174 Q |
| 3,950,858 | 4/1976 | Donner et al. | 33/179.5 R |
| 4,070,762 | 1/1978 | Siddall | 33/174 Q |
| 4,389,789 | 6/1983 | Meyer, Jr. | 33/174 Q |

Primary Examiner—Willis Little
Attorney, Agent, or Firm—Helgott & Karas

[57] ABSTRACT

A system for determining the precision of a numerically controlled machine tool involves setting the machine tool control to define a circular path. A circular standard is then aligned with the machine tool to sense the desired circular path. A continuous or pointwise sensing, as a function of whether a path-controlled or a point-by-point-controlled machine is being measured, of the aligned standard is performed. A faulty machine tool does not accurately cover the defined circular path. Variations from the desired circle can be plotted and used for evaluation.

16 Claims, 8 Drawing Figures

METHOD AND APPARATUS FOR DETERMINING PRECISION OF NUMERICALLY CONTROLLED MACHINE TOOL DEVICES

FIELD OF THE INVENTION

The present invention relates to geometrical measuring systems for determining the geometrical precision of numerically controlled machine tools.

BACKGROUND OF THE INVENTION

Machine tools are tested to determine their true operating values and their geometrical precision by means of standardized and comparable measuring methods before being placed in operation and thereafter periodically. The accepted and controlled methods used, e.g., for the geometrical precision, are set forth as measurement and test specifications and standards. These standards are mandatory and provide a uniform measurement and test procedure such that the results of measurements from different sources can be compared.

Typical standards are the German provisional standard DIN 8601 "Acceptance Conditions For Machine Tools For Cutting Metals", the guidelines of the Verein Deutscher Ingenieure VDI, and the Deutsche Gesellschaft fur Qualität DGQ which, in guideline No. 3441, defines the bases for the "Statistical Testing Of The Working And Positioning Accuracy Of Machine Tools". Other standards in this field are the United States National Aerospace Standard NAS 985 "Uniform Alignment Tests" and NAS 979 "Uniform Cutting Tests". A third standard known on a worldwide basis is the draft international standard DIS of the International Organisation for Standardization ISO, published as ISO/DIS 3070/0 "Test Conditions For Boring and Milling Machines With Horizontal Spindle—Testing The Accuracy (General Introduction)".

These conventional methods use a number of different specifications and standards for determining the actual states of machine tools, including the following for machine acceptance and for checking the geometrical precision or accuracy of the machine tool:

(1) Measurement of the individual machine components, e.g. by laser interferometers, electronic spirit levels, autocollimators, etc. However, such devices are complicted and expensive to obtain, operate and maintain. They also fail to provide details of the spatial error field, and thus, of all the component errors of the machine tool, because all the component errors cannot be measured simultaneously.

(2) Manufacture of test workpieces on the machine tool to be tested and subsequent measurement of this test piece on a measuring machine. This indirect method often fails to provide a clear and unambiguous indication of the relationship between the error on the test workpiece and the cause of the error. The conclusion drawn is often ambiguous. Also, the superimposing of the effects of the machine tool caused by variations in the workpiece, tool materials and tool state complicate the testing method.

(3) Measurement of test workpieces on machine tools, which are fixed in the machine tool in place of a workpiece. Probes or sensors working in various dimensions are used in place of the tool, and their deflections during operations are measured. A calculation employing the machine tool coordinates permits a quantitative determination of variations in the geometrical accuracy of the machine tool. This procedure obviates the problem of material variations and variations in the state of the tool. However, problems arise in coorelating the deflections on the sensor or probe with the coordinates of the machine tool. Generally, the machine tool coordinates must be manually incorporated.

If a machine tool has one or more geometrical errors or faults, it will not produce an exact circular curve. The divergence of the machine tool from the ideal geometry is indicated by variations from the circular shape. The circular shape test provides satisfactory information of the machine tool precision in one plane. If a sensor is used in the measurement on a machine tool, the influence or effect of the manufacturing process, ie.e, the interaction between material and tool is eliminated. However, the problem is incorporating the machine tool coordinates into the evaluation is still present. Here again, such coordinates generally must be manually associated in a very timeconsuming manner with the sensor coordinates.

SUMMARY OF THE INVENTION

Accordingly, an object of the present invention is to provide a method and apparatus for simply, rapidly and directly testing, on a machine tool, the geometrical precision of numerically controlled machine tool and measuring devices by measuring the divergence from a desired circular shape.

A further object of the present invention is to provide a method and apparatus for determining the geoemetrical precision of numerically controlled machine tool and measuring devices which reduce the possibility of error during the measurement and increase the reliability of the results.

The foregoing objects are basically obtained by a method for determining geometrical precision of numerically controlled machine tool apparatus or measuring apparatus, comprising the steps of arranging a standard in a plane including the path along which a tool of the apparatus moves, and detecting the standard with a sensor which is moved by the apparatus in at lest two different directions in that plane. The measurements obtained from said sensor are compared with predetermined geometric values stored in control for the apparatus.

The foregoing objects are also basically obtained by an apparatus for determining geometrical precision of numerically controlled machine tool or measuring devices, comprising a standard, a sensor and an analyzer. The standard is arranged in a plane including the path along which the tool of the device moves and is measured by the sensor in different directions in the plane. Signals produced by the sensor are analyzed.

By performing the method and providing the apparatus of the present invention in this matter, machine tools and measuring devices can be easily and quickly tested for geometrical precision directly on the machine tools and measuring devices. Comparison of the sensor signals with preset valves, in the control of the machine tool or measuring device, corresponding to the shape of the standard will provide a clear indication of the errors, without additional analysis.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS OF THE INVENTION

Figure 1:
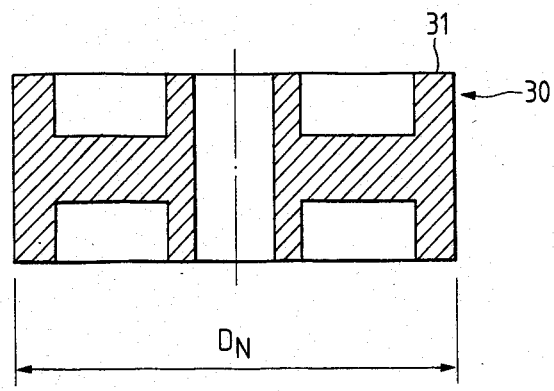
FIG. 1 is a side elevational view in section of a cylindrical standard according to the present invention.
Figure 2B:
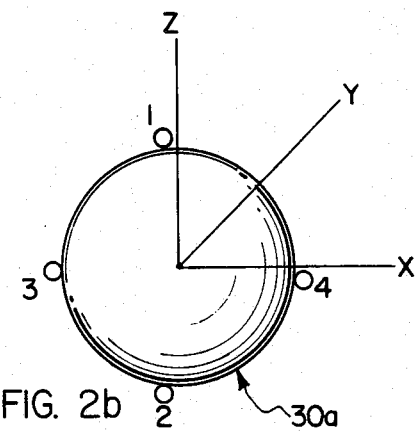
FIG. 2b is a top plan view of a spherical standard in a four-point sensing operation for determining the center of a circle.
Figure 2A:
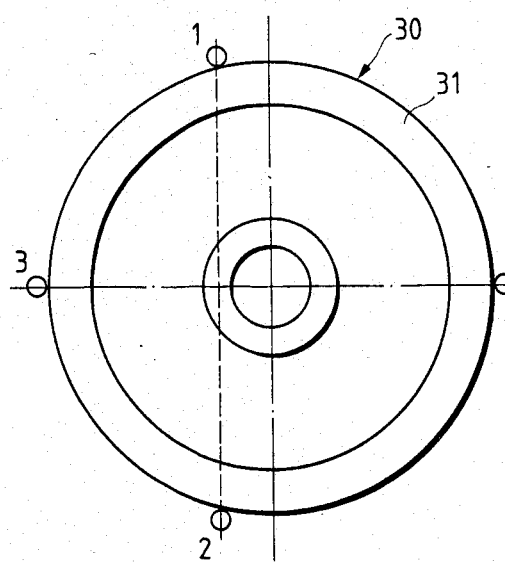
FIG. 2a is a top plan view of the cylindrical standard of FIG. 1 in a four-point sensing operation for determining the center of a circle.

The cylindrical standard 30 shown in FIGS. 1 and 2a for the method of the present invention has an external diameter $D_N$. The base plane 31 on at least one end face of the right cylindrically shaped part properly orients the standard relative to the machine tool movement such that the circular transverse cross section of the standard lies in the plane of movement of the tool of the machine tool being tested. FIG. 2b shows a spherical standard 30a.

Figure 3A:
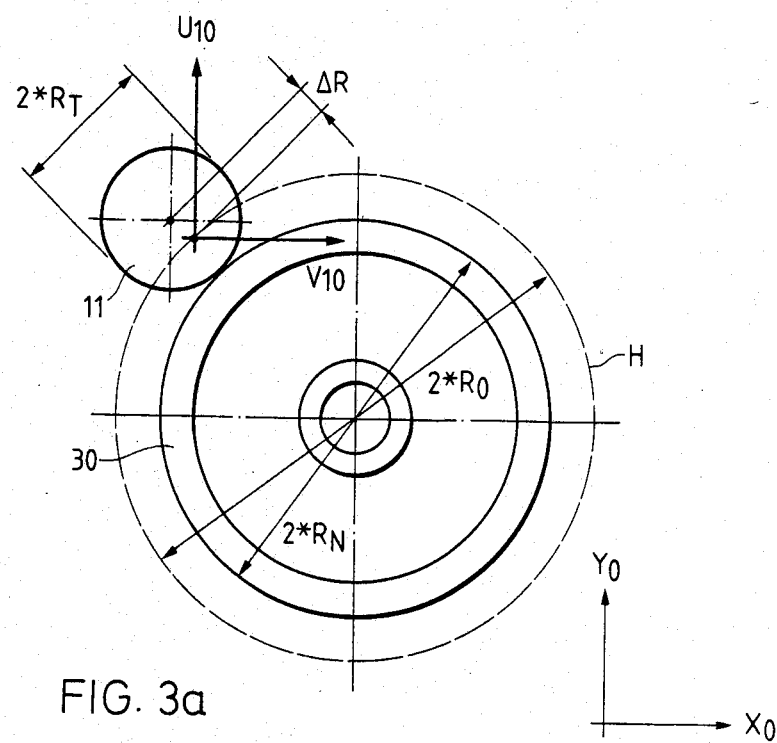
FIGS. 3a and 3b graphically illustrate the measuring system according to the present invention.

As illustrated in FIG. 3a, an auxiliary circular path H, corresponding to the standard, is defined and is used as a desired path for determining errors in a machine tool movement plane. The center of auxiliary circle H can be determined by four sensing operations 1 to 4 using a sensor, e.g. a 2D sensor, as shown graphically in FIG. 2. The coordinate system shown extends in the selected movement plane of the machine tool to be measured. The diameter of the auxiliary circle H is $2 \times R_o$, and the diameter of the standard is $D_N = 2 \times R_N$, while the center of both circles is congruent. The coordinates of the points on the auxiliary circle H either are stored in a computer as data, or are successively produced by a cooresponding program during the measurement operation.

Figure 3B:
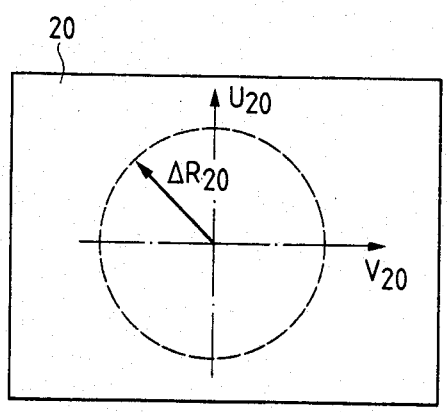

FIGS. 3a and 3b show the relationships between the auxiliary circle and the standard with a sensing ball 11 (FIG. 3a) and by an X-Y plotter 20 (FIG. 3b). Sensor deflection $\Delta R$ generates a circular plot $\Delta R_{20}$, which plot contains the mechanical and electrical amplification or gain factors $V_{TOT}$ determining the graphical magnitude. The relationship is defined as follows:

$$\Delta R_{20} = \Delta R \times V_{TOT} = (e.g.) \Delta R \times V_{sensor} \times V_{plotter}$$

In the present system, three independent coordinate systems which must be considered and correlated for performing the method:

(a) the coordinates of the machine tool $X_o$, $Y_o$, $Z_o$
(b) the coordinates of the sensitivity directions of the 2D sensor $U_{10}$, $V_{10}$, and
(c) the coordinates on the plotter $U_{20}$, $V_{20}$ By proper alignment of the standard on the machine tool, base plane 31 cooresponds with a possible movement plane of the machine tool. The desired circular movement, in a plane, of the machine tool is determined by the standard and is followed by the sensing mechanism which converts the movement to electrical signals.

In connection with a standard sensed on its outer surface, the method is explained in individual steps and in conjunction with FIGS. 3a and 3b.

A desired circular path of diameter $\phi = 2 \times R_o$, corresponding to the auxiliary circular path is defined for the machine tool to be tested. The radii $R_o$ and $R_{wz}$ (tool radius) fed into the numerical control NC can be determined from the following relationships:

$$R_o = R_N + R_T - SA; \ R_{wz} = 0 \tag{1a}$$

in which $R_N$ is the radius of the cylindrical standard, $R_T$ is the radius of the sensing ball, and SA is the desired deflection of the sensing ball.

The following relationships apply for standards sensed from the inside:

$$R_o = R_N - R_T + SA; \ R_{wz} = 0 \tag{1b}$$

With $R_o = R_N$, the value $R_{wz}$ can be determined by the following relationship:

$$R_{wz} = R_T - SA \tag{2}$$

The desired deflection SA should be approximately half the sensor measuring range and approximately twice the expected divergence from the desired circle. These factors are considered in setting the auxiliary circle.

The standard on the machine tool has its base plane aligned parallel to the desired machine tool movement plane. In this manner, the expected deflections of the sensor are in the desired movement plane.

A sensor, e.g. a 2D sensor, is mounted on the machine tool in place of its tool. The signal outputs of the sensor are fed to an XY-plotter.

Sensing several times, at different points about the cylindrical standard periphery using the sensor, provides values for determining the center of the circular cross section of the standard. The center determined by this procedure is used as the center of the desired circle. The predetermined desired circular path is now covered by the machine tool with the sensor being constantly in contact with the standard.

A fault-free machine tool precisely covers the circular path. At any point along the desired circle, the sensor is deflected radially in a constant manner with the desired deflection SA. Thus, the coordinate plotter, as shown in FIG. 3b, draws a circle with the sensor deflection R or its plot $R_{20}$. The corresponding gain factors between the actual deflection and the final plot can be determined by multiplying the individual gains according to the following:

$$\Delta_{plot} = \Delta_{WZM} \times V_{TOT} = \Delta_{WZM} \times \prod_{i=1} V_i,$$

in which $$\Delta_{WZM} = SA \pm \text{error}.$$

Generally, n equals two to three considering the gains of the sensor, the plotter and any intermediately connected amplifier.

Figure 4:
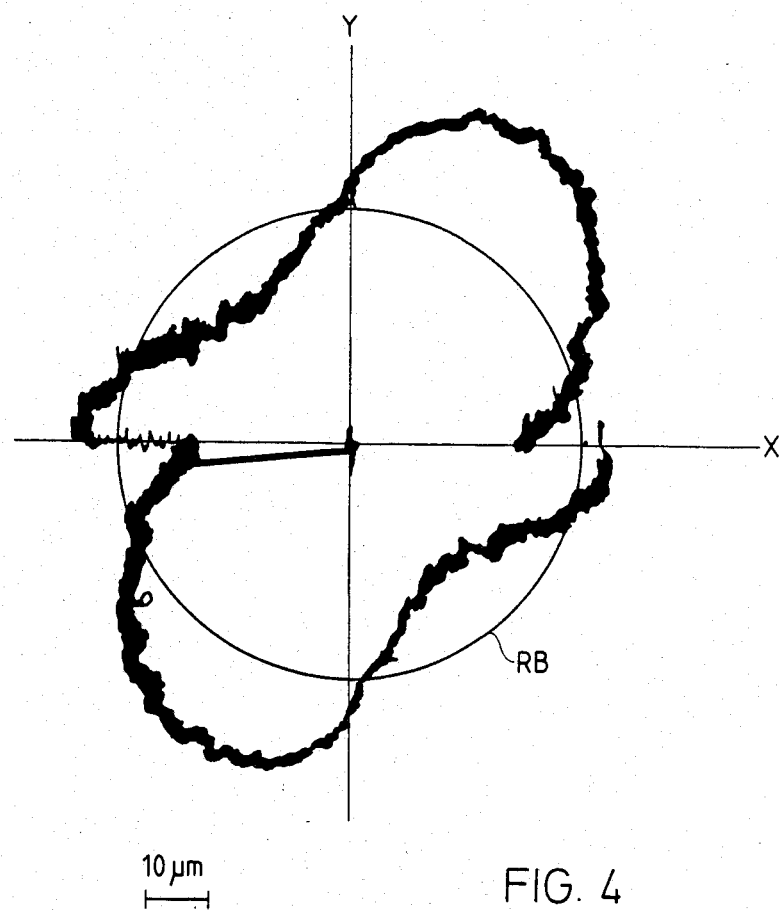
FIG. 4 is an example of a plot obtained using the method and apparatus of the present invention for a path-controlled machine tool.

A faulty machine does not precisely cover the circular path. The radial deflections of the sensor, a 2D sensor, in the represented example, do not coincide at all points along the path with the desired deflection. Thus, as shown in FIG. 4, there are divergences from the recording circle space RB. The desired circle corresponds to the auxiliary circle H, while the recording base is a circle of a radius equal to the desired sensor deviation (SA) multiplied by the gain but is not connected with the radius of the standard. Following the covering of the circular path, the result is immediately recorded as a report, without using a computer or any special evaluating instrument and without any further connection to the machine tool. The recording base (circle) can be recorded in the same report, if required.

FIG. 4 can now be interpreted to evaluate the positioning inaccuracy of the machine tool, which inaccuracy is displayed as a variation in a repeated measurement. Geometrical errors appear as shape divergences from the circle. Vibrations occurring during the measurement are shown by distortions of the recorded curve.

Figure 5:
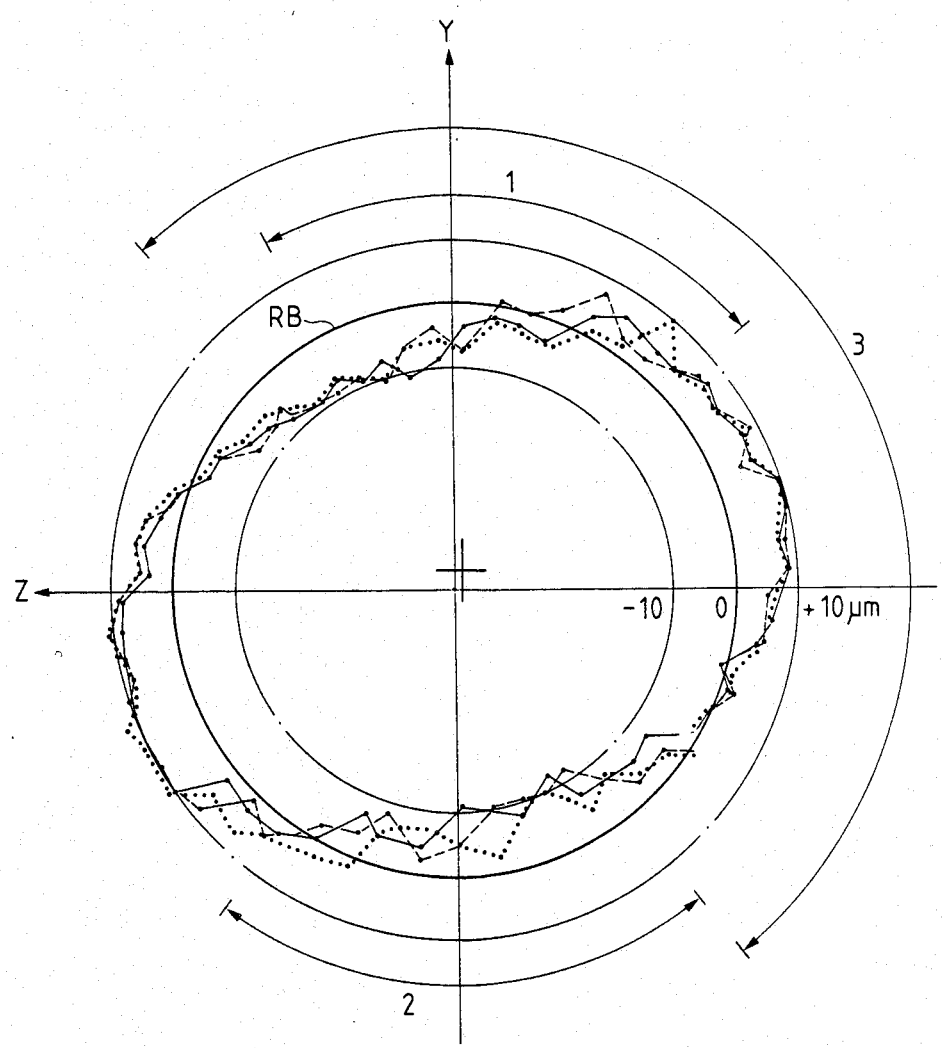
FIG. 5 is an example of a plot obtained on a machine tool controlled point-by-point.

FIG. 5 shows a curve formed by performing the method of the present invention, on a machine tool controlled on a point-by-point basis. The standard is now sensed in pointwise manner in contrast to the continuous method steps described above. For example, a NC or NCN program is produced on the machine tool to be tested, which program permits movement of the sensor to the measurement points in collision-free manner. This is followed by movement to the individual points in the NC or NCN program, while the sensor is in contact with the cylindrical standard at the corresponding points.

The pointwise recording of the diagram is obtained by lowering the plotter stylus. Generally, coordinate plotters have no input to the stylus control system. The lowering of the stylus onto the paper and the raising of the stylus from the paper preferably take place automatically at each measuring point. By means of the NC control system, a suitable port is connected to the stylus control system of the plotter so that a point plot is automatically produced.

The plot of FIG. 5 is somewhat broader than that of FIG. 4. In FIG. 5, central circle is designated zero and two further circles represent a ± scale of 10 μm. The circle portions 1 to 3 represent areas, which have to be specifically interpreted. Three different test measurements are shown in superimposed form. FIG. 5 shows an exemplified proposal for a measurement report in connection with a machine test using the method according to the invention.

During the measurements, there is long position seeking in portions 1, 2 and passing over portion 3. It is also possible to detect during the recording that, on starting, the machine is moved in the direction of the workpiece by a distance of 50 to 100 μm. The shape error is clearly evident by the elliptical actual curve.

Figure 6:
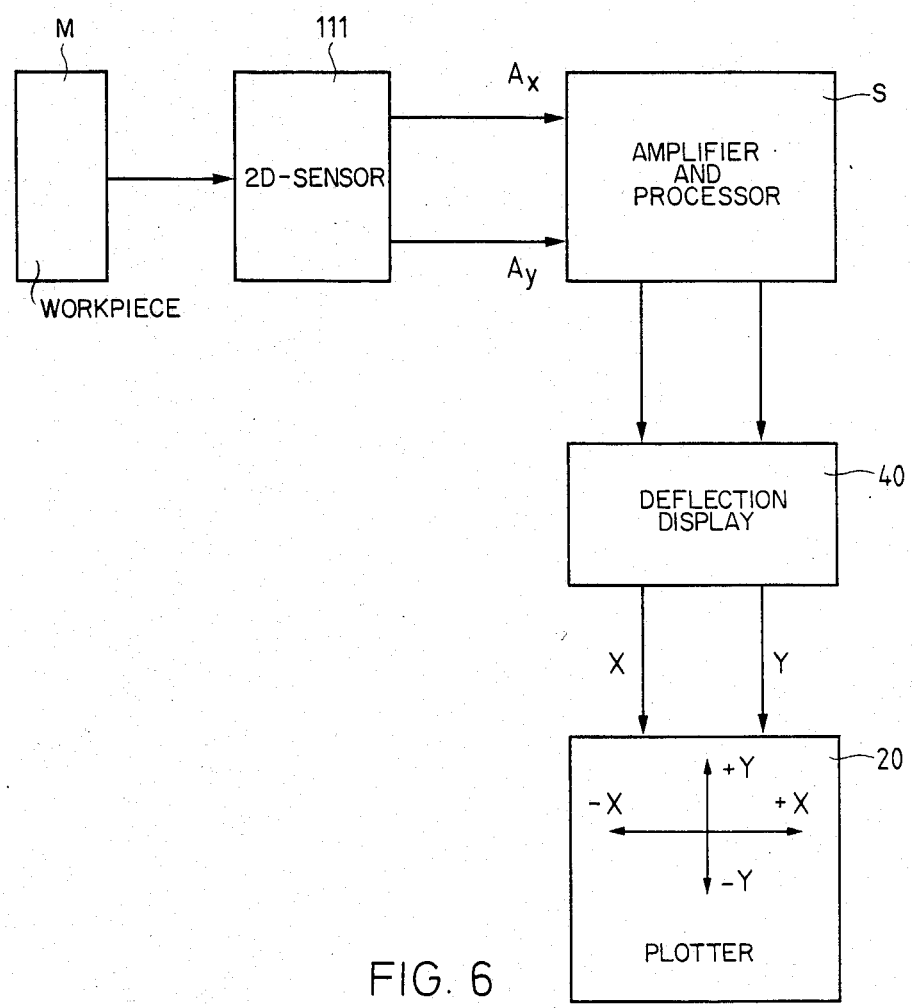
FIG. 6 is a block diagram of the system of the present invention.

FIG. 6 shows a block diagram of the apparatus for performing the method according to the present invention. The mechanically measured quantity M is converted in a sensor 111 with sensing ball 11 into a coordinatedependent electrical signals $A_x$ and $A_y$. Deflection signals $A_x$, $A_y$ are further processed in internal circuit S and passed to the deflection display 40 and to a plotter 20. The plotter is set such that no deflection is recorded when the sensor is in the inoperative state, i.e., the stylus is at the origin of a four-quandrant coordinate system. The recording base, together with the coordinate system can already be printed on a test report produced for the plotter. The origin is set on the xy plotter and the circular shape is measured.

While various embodiments have been chosen to illustrate the invention, it will be understood by those skilled in the art that various changes and modifications can be made therein without departing from the scope of the invention as defined in the appended claims.

What is claimed is:

1. A method for determining geometrical precision of numerically controlled machine tool or measuring apparatus, comprising the steps of:
   arranging a standard in a plane including the path along which a tool of the apparatus moves;
   mounting a 2D sensor having an axis of rotational symmetry in a tool mount of the apparatus such that the axis of rotational symmetry is essentially normal to said plane and the sensor is restrained against rotation about the axis of rotational symmetry relative to the apparatus;
   detecting said standard in at least two different directions with said sensor which is moved by the apparatus in a step-by-step pattern about said standard to effect a translation in said plane; and
   comparing measurements obtained from said sensor with predetermined geometric values stored in control means for the apparatus.

2. A method according to claim 1 wherein
   a circular path is stored in said control means of the apparatus;
   said standard is arranged to define a circle in transverse cross section in said plane, said circle corresponding to said circular path;
   said sensor measures said standard in at least two directions in said plane; and
   electrical sensing signals produced by said sensor are compared with predetermined values of electrical signals corresponding to said circular path produced by said control means.

3. A method according to claim 2 wherein said circular path is defined by electrical signals such that a currentless level corresponds to the center of the circle of the transverse cross section of said standard;
   said sensor mechanically senses said standard in said plane and produces electrical signals correlated with geometrical dimensions of the apparatus; and
   the signals produced by said sensor are combined with signals corresponding to the geometrical dimensions of said sensor to produce new signal representing geometrical dimensions of the apparatus.

4. A method according to claim 1 wherein a circular path is stored in said control means of the apparatus;
   said standard is arranged to define a circle in transverse cross section in said plane, said circle corresponding to said circular path;
   said sensor measures said standard in at least two directions in said plane;
   electrical sensing signals produced by said sensor are plotted as a first curve on a recording base with a second curve corresponding to said circular path; whereby the measurements from said sensor can be optically compared with said circular path.

5. A method according to claim 4 wherein said first curve, compensating for error, and said second curve are concentric.

6. A method according to claim 1 wherein said standard has an outer cylindrical surface.

7. A method according to claim 1 wherein said standard has an inner cylindrical surface.

8. A method according to claim 1 wherein said standard has a stepped cylindrical surface.

9. A method according to claim 1 wherein said standard is spherical.

10. A method according to claim 1 wherein said standard is detected by the sensor in the two different directions simultaneously at each detection point.

11. An apparatus for determining geometrical precision of numerically controlled machine tool or measuring devices, comprising:
 a standard arranged in a plane including the path along which a tool of the device moves;
 2D sensor means, mounted in the device, for measuring said standard in at least two different directions in said plane, said sensor means having an axis of rotational symmetry essentially normal to said plane, and being movable in a step-by-step pattern about said standard by the device to effect a translation in said plane and restrained against rotation about said axis of rotational symmetry in the device; and
 means for analyzing the signals produced by said sensor means.

12. An apparatus according to claim 11 wherein said standard has an outer cylindrical surface.

13. An apparatus according to claim 11 wherein said standard has an inner cylindrical surface.

14. An apparatus according to claim 11 wherein said standard is spherical.

15. An apparatus according to claim 11 wherein said sensor means is a two-dimensional 2D sensor.

16. An apparatus according to claim 11 wherein said sensor means measures said standard in the two different directions simultaneously at each measurement location.

* * * * *

UNITED STATES PATENT AND TRADEMARK OFFICE
CERTIFICATE OF CORRECTION

PATENT NO. : 4,662,074
DATED : May 5, 1987
INVENTOR(S) : Wolfgang Knapp and Stojan Hrovat It is certified that error appears in the above-identified patent and that said Letters Patent are hereby corrected as shown below:

On the title page, item [73] Assignee:
delete "Schweizerische Gesellschaft fur Werkzeugmaschinenbau and Fertigungstechnik, Zurich, Switzerland" and replace it with -- Meseltron S.A., Corcelles, Switzerland--

Signed and Sealed this

First Day of September, 1987

*Attest:*

DONALD J. QUIGG

*Attesting Officer*  Commissioner of Patents and Trademarks